2,740,814
Patented Apr. 3, 1956

2,740,814

LONG CHAIN ALKYL-BENZENESULFONAMIDO-ALKANOL ETHERS

James Martin Cross, Belvidere, N. J., and Max Eugene Chiddix, Easton, Pa., assignors to General Aniline & Film Corporation, New York, N. Y., a corporation of Delaware No Drawing. Application January 17, 1952, Serial No. 267,012

5 Claims. (Cl. 260—556)

This invention relates to novel surface active agents obtained by the condensation of alkylene oxide with N-alkyl alkylated benzenesulfonamides. These novel products may be characterized by the following general formula:

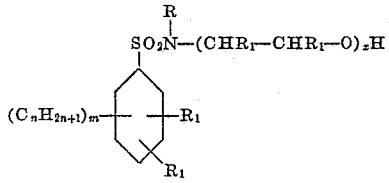

wherein $n$ is an integer of from 4 to 20 and $m$ is an integer of from 1 to 3, the total number of carbon atoms in the alkyl groups attached to the benzene nucleus is 6 to 30; R is an alkyl or cycloalkyl group of from 1 to 12 carbon atoms; $R_1$ is hydrogen or methyl; and $x$ is an integer of from 1 to 30.

The most conspicuous property of these new products is their great activity at surfaces and interfaces which promotes their use in a large field of the technical arts. The possible application of the new substances are extremely varied. For instance, they can be used as wetting, frothing, or washing agents in the treating and refining of textiles; for converting liquid or solid substances, which per se are insoluble in water (such as hydrocarbons, higher alcohols, fats, oils, waxes, resins, pitches and pitchy substances), into creamy emulsions or fine, stable dispersions; for carbonizing; for dyeing in acid baths; for dyeing animal fibers with vat dyestuffs; for dyeing in alkaline, acid or neutral baths; for the pasting of dyestuffs; for fulling, sizing, impregnating and bleaching treatments; as cleansing agents in hard water; for dyeing in "padding" (impregnating) liquors; for dyeing with diazo preparations; in tanning and mordanting processes; as an aid in dyeing and printing with aniline black; as an aid in desizing textile materials; for the preparation of azodyestuffs in finely divided form; as a fat decomposition agent for the removal of fats; for the cleansing of vegetable fibers; as an aid to the retting of flax; as an aid to mercerizing lyes; for producing foam in fire extinguishers; as a means for improving the absorptive power of fibrous bodies; as an aid in softening baths for hides and skins; as a disinfectant; as an insecticide; and for sulfonating oils and fats.

In addition these products are valuable emulsifiers for insecticide compositions and agricultural sprays such as DDT, 2,4–D, Toxaphene, Chlordane, dormant or mineral oil sprays, nicotine sulfate, Dieldrin, Aldrin, Lindane, B. H. C., Heptachlon, Chloro I. P. C., I. P. C., Methoxychlor, etc.

These products are valuable for use in the petroleum industry as additives for fuel oils, hydraulic fluids, lubricating oils, cutting oils, greases, and as additives to the water or brine used in oil recovery from oil-bearing strata by flooding techniques.

These products are also useful as emulsifiers for emulsion polymerization, as mercerizing assistants, wetting agents, rewetting agents, dispersing agents, detergents, penetrating agents, softening agents, cutting oils, lime soaps dispersants, dishwashing agents, anti-static agents, disinfectants, insecticides, mothproofing agents, bacteriocides, fungicides and biocides.

They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

These products are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rush inhibitors, in the protection of metals especially ferrous metals, in acid pickling baths, in acid cleaning compositions and in electroplating baths.

Other valuable uses are as solvents, as cleaning agents for paint brushes, as additives for paints, lacquers and varnishes; as lubricants, as greases, and stuffing agents.

These products are valuable in the preparation of skin creams, lotions, salves and other cosmetic preparations such as home hair-wave sets, shampoos, toothpastes, etc. They may also be of value in food products as foaming agents, emulsifying agents, and softening agents.

Other valuable uses are in metal cleaning compositions, industrial dry cleaning compositions, additives for rubber latices, foam inhibitors for synthetic rubber latex emulsions, froth flotation agents, in preventing or breaking foams, additives for road building materials such as air intraining agents for concrete or cement, additives to asphalt compositions, plasticizers and modifiers for vinyl plastics, alkyl resins, phenol-formaldehyde resins and other types of polymeric-type plastic materials such as polythene, Teflon, etc.; for incorporation into adhesives, paint, linoleum; into bonding agents used in various insulating and building materials; as refining aids in sulfite wood digesters to prepare pulp; as additives to pulp slurries in heating operations to prevent foaming and also aid the beating operation in papermaking.

These novel N-alkyl alkylbenzene sulfonamide alkylene oxide condensation products may readily be prepared by treating an alkylbenzene containing 6 to 20 alkyl carbon atoms with an excess of chlorosulfonic acid, washing and drying and then treating the oil layer, which contains the corresponding sulfonyl chloride of the alkylbenzene with a primary alkyl amine containing 1 to 12 carbon atoms. There is thus obtained an N-alkyl alkylbenzene sulfonamide, the amido hydrogen of which may be replaced by a polyglycol ether group, by methods known in the art, to produce the novel N-alkyl alkylbenzene sulfonamide alkylene oxide condensation products of the present invention. Advantageously, the polyglycol ether group may be introduced in the molecule by reacting the N-alkyl alkylbenzene sulfonamide with an alkylene oxide in the presence of an alkaline catalyst in the manner described in U. S. P. 1,970,578 to Schoeller et al.

It has been found that valuable products, having surface active properties may be produced, starting from any alkyl benzene containing from 6 to 30 alkyl carbon atoms.

It has been found that particularly valuable products may be obtained from alkylbenzenes produced by alkylation of benzene or homologues of benzene with mixed olefines of C₉ to C₁₂ fraction obtained by polymerization of propylene or butylene. Also, such alkylbenzenes as those obtained by alkaylation of benzene with halogenated hydrocarbon fractions containing 6 to 12 or higher (up to 30 carbon atoms) and obtained by halogenation of petroleum fractions may be used (for example alkylbenzenes prepared as described in U. S. Patent 2,220,099 to Gunther et al.). If desired, such alkylbenzenes as dodecyl benzene, dodecyl toluene, isooctyl benzene benzene, nonyl toluene (prepared from propylene trimer), diamyl benzene, nonyl benzene and the like may be prepared as indicated above.

The above alkylbenzenes containing 6 to 20 alkyl carbon atoms are readily converted to the corresponding alkylbenzene sulfonyl chlorides by treatment with an excess of chlorosulfonic acid, followed by washing and drying. The thus obtained sulfonyl chloride is then treated with a primary alkyl amine containing 1 to 12 carbon atoms such as methyl, ethyl, propyl, isopropyl, butyl, amyl, octyl, isooctyl or dodecylamine to produce an N-alkyl alkylbenzene sulfonamide.

It has been found that the nature of the primary alkylamine condensed with the alkylbenzene sulfonyl chloride may be varied depending on the particular application intended for the final product. Lower alkyl amines, such as methyl and ethylamine, are to be preferred when the product is intended for production of compounds having a terminal sulfate or sulfonic acid group on the polyglycol ether group. In such cases, the group R on the sulfonamido nitrogen functions to prevent more than one polyglycol ether radical being introduced into the molecule and, thus, in the ultimate product, prevent formation of compounds having two sulfate or sulfonic acid groups which would be too water soluble to be of interest in many applications of surface active agents. However, by increasing the length of the group R in the final products (by using higher alkyl amines for condensation with the alkylbenzene sulfonyl chloride) it is possible to produce products which contain the water solubilizing group (polyglycol ether group) near the middle of the molecule. This central position of the water solubilizing group has been found to favor increase in the wetness power of surface active agents while when the solubilizing group is near the end of the molecule, the emulsifying power is accented.

The thus obtained N-alkyl alkylbenzenesulfonamide is then converted to the novel products of the present invention by condensing it with an alkylene oxide (1 to 30 moles of alkylene oxide per mole of N-alkyl alkylbenzenesulfonamide).

For most purposes, it is desirable to employ ethylene oxide as an alkylene oxide in this condensation since products having greatest water solubility are obtained in this manner. However, propylene oxide may be used, if desired, although the solubility of the product is somewhat decreased, particularly, with the same molar amount of propylene oxide. Mixtures of ethylene and propylene oxide may be found valuable for obtaining products for particular applications and mixtures of ethylene and butylene oxide may also be found useful for obtaining products for particular applications.

The amount of ethylene or other alkylene oxide to be condensed with an alkyl benzene sulfonamide will vary with the particular application for which the product is intended. It has been found that when the novel polyglycol ethers of an N-alkyl alkylbenzene sulfonamide of the present invention are to be converted into products in which the polyglycol ether group has a terminal sulfate or sulfonic group that relatively short polyglycol ether chains (i. e., containing 1 to 6 alkenoxy groups) are to be preferred. In products designed to break foams and prevent foaming, one to two alkenoxy groups give superior results. While in N-alkyl alkylbenzene sulfonamide polyglycol ethers intended for use as emulsifiers and detergents, compounds containing a polyglycol ether chain of from 6–12 alkenoxy groups are to be preferred, and in compounds which are of particular interest for petroleum emulsion breakers, longer polyglycol ether chains (containing 15 to 30 alkenoxy groups) are preferred. The relative length of the polyglycol ether group will also depend to some extent on the particular alkylbenzene employed and also on the nature of the alkyl substituent on the sulfonamido nitrogen. As the molecular weight of either of these radicals increases, the number of alkenoxy groups in the polyglycol ether should be increased to produce products having substantially equal water or oil solubility.

The present invention may be illustrated by the following specific examples:

EXAMPLE I

A. Octylbenzene

To 1870 parts of dry benzene and 448 parts of octene-1 contained in a 5 liter, 3-necked flask, equipped with a stirrer, dropping funnel, and thermometer, there was added 21.5 parts of powdered anhydrous aluminum chloride and 19.5 parts of dry hydrogen chloride gas. The mixture was agitated for 3 hours at 25–30° C. Then the lower layer was removed. The upper layer was washed with dilute hydrochloric acid, and with dilute sodium hydroxide. Toluene and water were distilled from the oil layer, and the residue was fractionated in a short helices-filled column. There was obtained 551 parts of octylbenzene, boiling at 117–121° C./15 mm.

B. Octylbenzenesulfonyl chloride

In a 1 liter, 4-necked flask was placed 228 parts of octylbenzene prepared above. It was stirred at 5–10° C., and 420 parts of chlorosulfonic acid was added dropwise in 1½ hours. The mixture was agitated for 3 hours at 25–30° C., and then stirred into 900 parts of cracked ice. The product was extracted from the ice and water with 500 parts of ether. After the ether solution was washed with water and dilute sodium carbonate, it was dried over calcium chloride. The ether was distilled under reduced pressure, leaving 282 parts of crude product (81% yield). By distilling the crude product under reduced pressure, there was obtained 272 parts of octylbenzesulfonyl chloride, boiling at 149–193° C./1 mm. Analysis for Cl: Calc'd., 12.29%; found, 12.37%.

C. N-methyl octylbenzenesulfonamide

A mixture of 231 parts of octylbenzenesulfonyl chloride and 200 parts of dry benzene was stirred at 10–15° C. Methylamine gas, generated by dropping 200 parts of 40% methylamine solution on 400 parts of technical sodium hydroxide flakes, was passed into the stirred reaction mixture until the gain in weight was 60.4 parts. The mixture was stirred one-half hour at room temperature and 1 hour while heating under reflux. The benzene was removed by distillation, and the residue was washed 3 times with 500 parts of hot water. The water washes were extracted with 300 parts of ether which was then added to the oil. The ether solution was dried over calcium chloride, filtered, and the ether distilled. The weight of crude N-methyloctylbenzenesulfonamide was 190.3 parts. Analysis for N; Calculated 4.95%; found, 4.79%.

D. Reaction product with ethylene oxide

To 50 parts of the above product was added 0.2 part of powdered KOH and 62.4 parts ethylene oxide gas. This is eight moles of ethylene oxide for each mole of N-methylbenzenesulfonamide. The resulting condensation product gave a 1% solution with water which clouded at a temperature of 44.5° C.

The ethylene oxide condensation product had a wetting strength 90% of that of a commercial nonionic surface active agent which was the polyglycol ether of isooctyl phenol and in which the polyglycol ether groups contained an average of 8–9 ethenoxy groups. It was equal in wool detergency and almost equal in cotton detergency to this commercial nonionic surface active agent from isooctyl phenol. The emulsifying power is shown in Table 1.

EXAMPLE II

Octyltoluene was prepared from 2230 parts of toluene, 750 parts of octene-1, 32 parts of anhydrous aluminum chloride, and 19 parts of hydrogen chloride using the method of paragraph 1 of Example 1. Yield: 865 parts.

A 75% yield of octyltoluenesulfonyl chloride was obtained by treating 245 parts of octyltoluene with 420 parts of chlorosulfonic acid by the method of paragraph 2 of Example 1. The boiling point of the product was 144–174° C./1 mm.

N-ethyloctyltoluenesulfonamide was prepared by treating octyltoluenesulfonyl chloride with gaseous ethylamine by the method of paragraph 3 of Example 1. Analysis for N; Calculated, 4.50%; found, 4.71%.

To 55.5 parts of N-ethyloctyltoluenesulfonamide was added one-fourth part powdered KOH, and 54 parts ethylene oxide. This is a mole ratio of ethylene oxide to sulfonamide of 6.85 to 1. A 1% solution of this condensation product showed two cloud points. Below 23.5° and above 57° C. it was cloudy. Between those two temperatures, it was hazy.

This product had a wetting strength of 68% of that of a commercial nonionic surface active agent which was the polyglycol ether of isooctyl phenol and in which the polyglycol ether groups contained an average of 8–9 ethanoxy groups. It was equal in wool detergency but inferior in cotton detergency to this commercial nonionic surface active agent from isooctylphenol. The emulsifying power is shown in Table 1.

EXAMPLE III

One hundred and three parts of N-butyl octyltoluenesulfonamide was obtained by treating 110 parts of distilled octyltoluenesulfonyl chloride (prepared as described in paragraph 2 of Example II) in 200 parts of benzene with 80 parts of N-butylamine, boiling point 78–79° C. by the method of Example I. Analysis for N: Calculated, 4.13%; found 4.22%.

The condensation product from 50 parts of N-butyl octyltoluenesulfonamide, and 51.7 parts of ethylene oxide (mole ratio 8:1) gave a 1% solution in water which became cloudy below 8° C. and above 55° C. This product had a wetting strength 30% of that of a commercial nonionic surface active agent which was the polyglycol ether of isooctyl phenol and in which the polyglycol ether groups contained an average of 8–9 ethanoxy groups. It was equal in wool detergency but inferior in cotton detergency to this nonionic surface active agent from isooctyl phenol. The emulsifying power is shown in Table 1.

TABLE 1

[Emulsification tests (comparison with commercial nonionic surface active agents which was the polyglycol ether of isooctyl phenol and in which the polyglycol ether groups contained an average of 8-9 ethanoxy groups as to emulsion stability.]

| Ethylene Oxide Condensation Product of— | Mol Ratio, Ethylene Oxide to Sulfonamide | Emulsion with Solvesso No. 100 | Emulsion with Xylene | Emulsion with Velsicol Ar 50 |
|---|---|---|---|---|
| (1) N-Methyl octylbenzene sulfonamide, Example I. | 8.1 | Very superior. | Superior | Superior. |
| (2) N-Ethyl octyltoluene sulfonamide, Example II. | 6.9 | ...do | Inferior | Inferior. |
| (3) N-Butyl octyltoluene sulfonamide, Example III. | 8.0 | ...do | ...do | Do. |

EXAMPLE IV

A. Dodecylbenzenesulfonyl chloride

Into a 500 cc. 4-necked flask equipped with mechanical stirrer, thermometer, dropping funnel, calcium chloride tube and hydrogen chloride trap, there was charged 200 cc. chloroform and 73.8 g. (0.3 mol) Oronite alkane (a commercial dodecylbenzene made by the alkylation of benzene with propylenetetramer). To remove any moisture present, 100 cc. of chloroform was distilled from the flask. The solution was then cooled to 0° C. To the stirred solution was added dropwise 105 g. (0.9 mol) of chlorosulfonic acid while holding the temperature at 0–5° C. This addition required one half hour. The cooling bath was removed and the temperature of the mixture was allowed to rise to 25–30° C. The mixture was allowed to stand over-night at this temperature. The mixture was then stirred slowly into 800 g. cracked ice. The lower chloroform layer was separated and washed four times with 500 cc. of ice-water. It was dried over calcium chloride and then over Drierite. The chloroform was removed by distillation under reduced pressure from a water bath at 50° C. The residue of crude dodecylbenzenesulfonyl chloride weighed 74.6 g. (72% of the 103 g. theoretical yield).

B. N-methyl dodecylbenzenesulfonamide

Into a 5 liter 3-necked flask equipped with stirrer, thermometer, dropping funnel, and reflux condenser was placed 575.8 cc. (186 g. 6 mols of 100% methylamine) of 32% aqueous methylamine. To the stirred methylamine solution was added dropwise at 20–25° C. 507 g. of dodecylbenzenesulfonyl chloride dissolved in 387 g. of propylene dichloride. The addition required 35 minutes. The mixture was stirred rapidly for one half hour at 25–30° C. and then for 3 hours at reflux temperature. To the mixture was added 500 cc. of hot water. The propylene dichloride solvent was removed along with 135 cc. of water by distillation to a pot temperature of 102° C. To the aqueous product mixture was added 50 cc. of 30% salt solution. A 20 cc. lower layer of salt water was separated and the crude product washed twice with a solution of 200 cc. of 30% salt in 500 cc. of hot water. The layers separated readily at 90° C. To the crude product layer was added 450 cc. of toluene. An additional water layer of 168 cc. was separated. The remainder of the water in the product was removed azotropically by distillation with the toluene. The toluene was then removed by distillation under reduced pressure. There was obtained a residue of crude N-methyl dodecylbenzenesulfonamide of 395.4 g. and an additional 2.9 g. of product was recovered from the water wash layers making a total of 399.3 g. (87% of the 457 g. theoretical yield). There was obtained the following analysis for nitrogen. Calculated for $C_{19}H_{33}SO_2N$, 4.13%; found, 4.08%.

C. Reaction product with ethylene oxide

To a stirred mixture of 80 g. (0.24 mol) of the dry N-methyl dodecylbenzenesulfonamide prepared above, and 0.32 g. of powdered potassium hydroxide, heated to 180° C. in a suitable gas tight vessel was added ethylene oxide gas a little at a time until the gain in weight of the reaction mixture was 62.2 g. This corresponded to an addition of 1.41 mols of ethylene oxide, and a mol ratio of ethylene oxide to sulfonamide of 5.9 to 1. The reaction product was readily soluble in water to give a dilute, hazy solution which foamed copiously on shaking. A 2% solution of the product became cloudy upon heating to 74° C.

EXAMPLE V

In a similar manner, the reaction product of 70 g. (0.21 mol) of dry N-methyl dodecylbenzenesulfonamide with 72.5 g. (1.65 mols) of ethylene oxide was prepared. This is a mol ratio of 7.9 to 1. A 2% solution of this product in water became hazy upon heating to 42° C. and quite cloudy above 90° C.

EXAMPLE VI

Using the same procedure as Example IV, the reaction product of 60 g. (0.18 mol) of dry N-methyl dodecylbenzenesulfonamide with 77.8 g. (1.77 mols) of ethylene oxide was prepared. This is a mol ratio of 10.0 to 1. This product was readily soluble in water to give solutions which foamed easily upon shaking. A 2% aqueous solution of this compound became cloudy at 90° C. This product was found to be a highly efficient emulsifier for solutions of DDT in aromatic solvents such as xylene. Used in concentrations as low as 3% in the DDT solution, it produced excellent emulsions even in hard water.

EXAMPLE VII

Using the same procedure as Example IV, the reaction product of one mole of dry N-methyl dodecylbenzenesulfonamide with two moles of ethylene oxide was prepared. The product was effective as an antifoam agent in latex paints and in paper making operations.

EXAMPLE VIII

Using the same procedure as Example IV, the reaction product of one mole of N-methyl dodecylbenzenesulfonamide with twelve moles of ethylene oxide was prepared. The product, which foamed copiously in water, was an excellent lime soap dispersing agent.

We claim:

1. Surface active agents of the formula

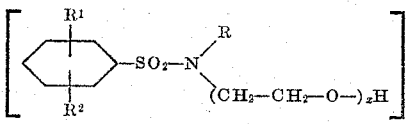

wherein $x$ represents an integer of from 6 to 12; R represents an alkyl group having from 1 to 4 carbon atoms; $R^1$ represents a member of the group consisting of hydrogen and methyl, and $R^2$ represents an alkyl group having from 8 to 12 carbon atoms.

2. Surface active agents of the formula

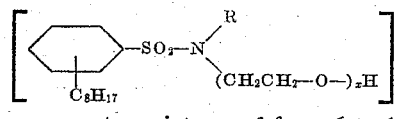

wherein $x$ represents an integer of from 6 to 12, and R represents an alkyl group having from 1 to 4 carbon atoms.

3. Surface active agents of the formula

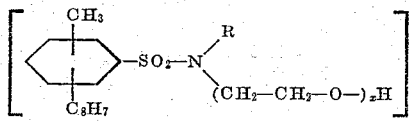

wherein $x$ represents an integer of from 6 to 12, and R represents an alkyl group having from 1 to 4 carbon atoms.

4. Surface active agents of the formula

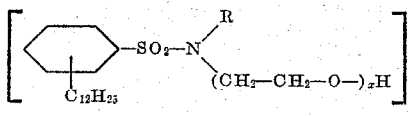

wherein $x$ represents an integer of from 6 to 12, and R represents an alkyl group having from 1 to 4 carbon atoms.

5. Surface active agents of the formula

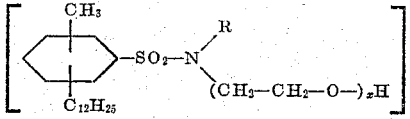

wherein $x$ represents an integer of from 6 to 12, and R represents an alkyl group having from 1 to 4 carbon atoms.

References Cited in the file of this patent

UNITED STATES PATENTS

| | | |
|---|---|---|
| 2,093,947 | Albrecht | Sept. 21, 1937 |
| 2,106,244 | De Groote | Jan. 25, 1938 |
| 2,577,256 | Lundsted | Dec. 4, 1951 |
| 2,649,478 | Carnes | Aug. 18, 1953 |

FOREIGN PATENTS

| | | |
|---|---|---|
| 470,181 | Great Britain | Aug. 3, 1939 |
| 625,644 | Great Britain | July 1, 1949 |
| 799,220 | France | Mar. 27, 1936 |
| 882,385 | France | Mar. 1, 1943 |